Dec. 29, 1936.  T. O. HALL  2,065,891
AUTOMATIC PROJECTOR LAMP
Filed Feb. 15, 1932  4 Sheets-Sheet 1
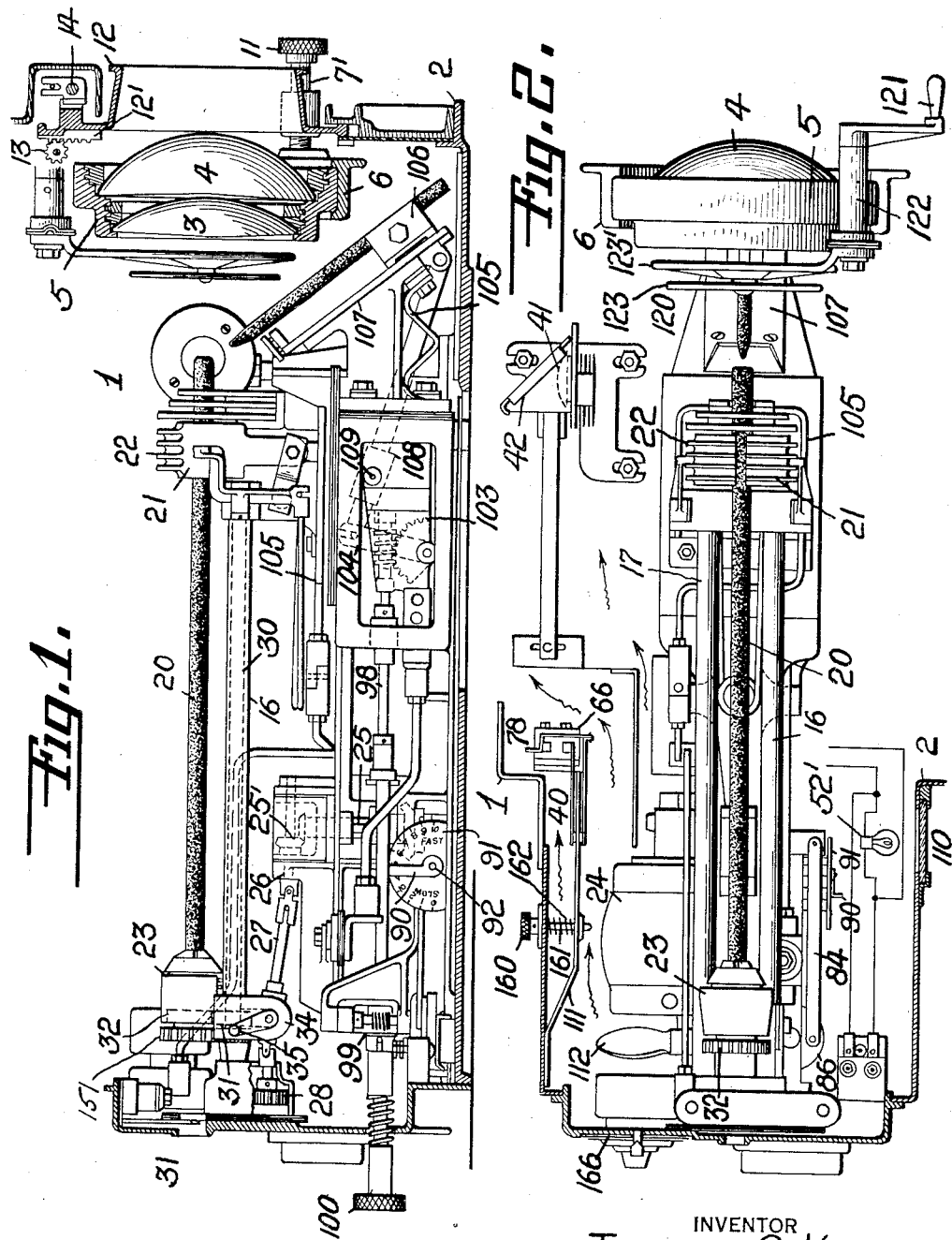
INVENTOR
THEODORE O. HALL.
BY
Herbert H. Thompson
his ATTORNEY.

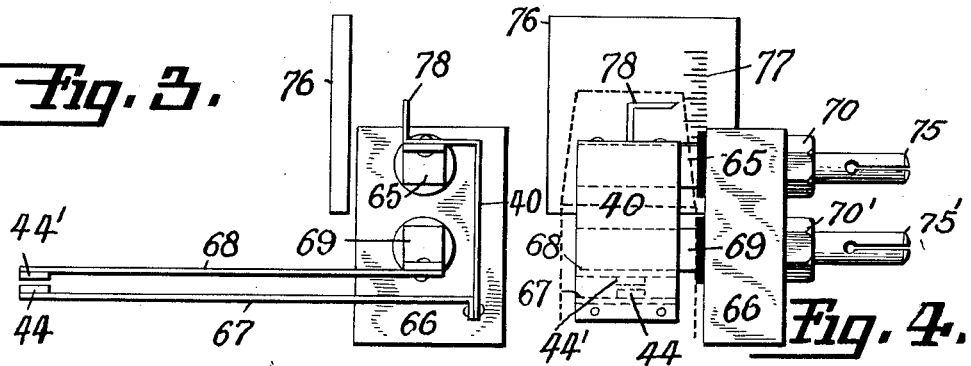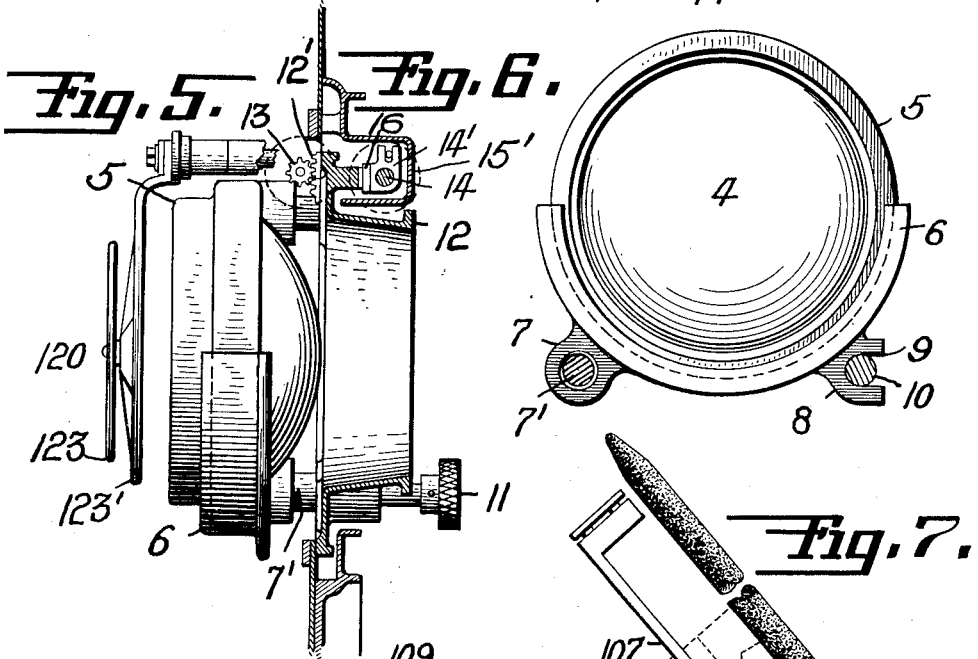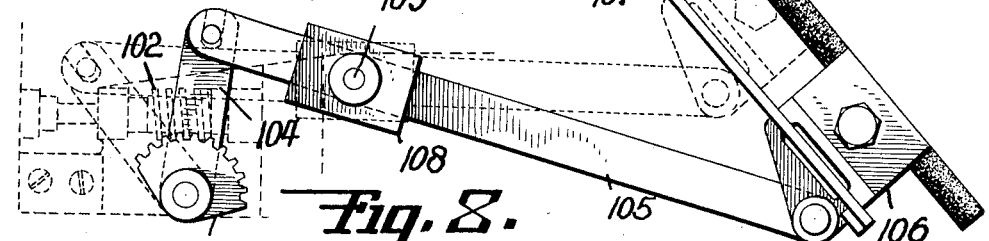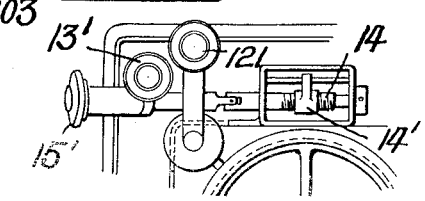

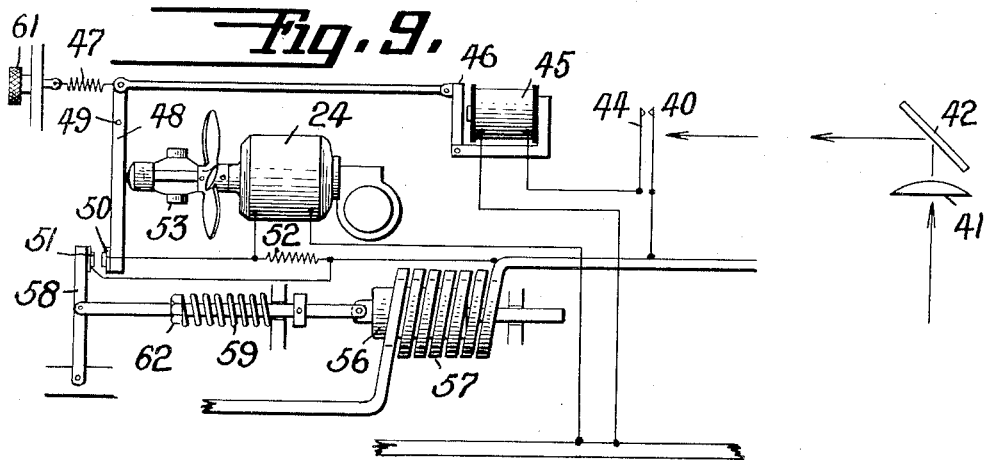
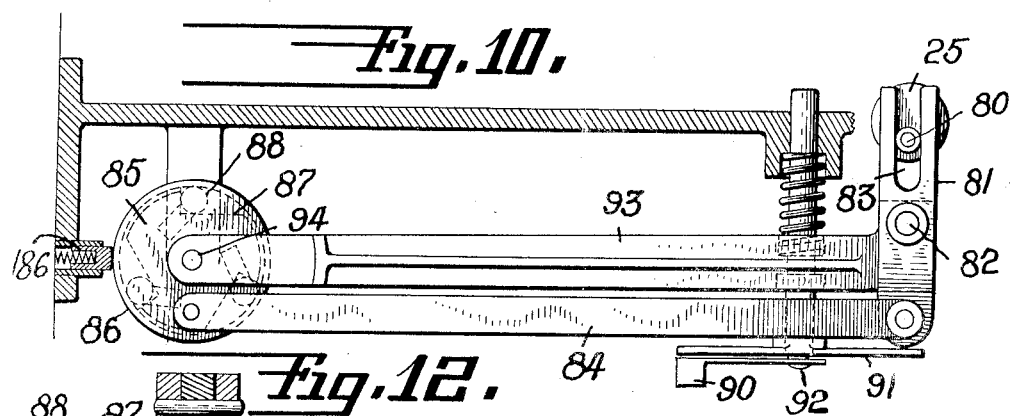
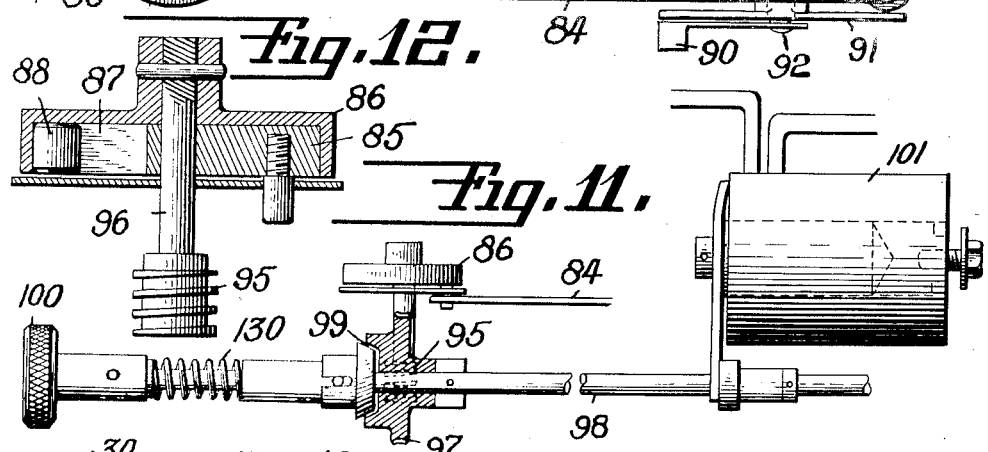
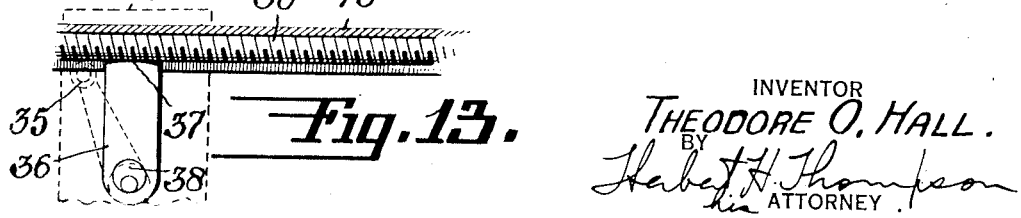

Dec. 29, 1936. T. O. HALL 2,065,891
AUTOMATIC PROJECTOR LAMP
Filed Feb. 15, 1932 4 Sheets-Sheet 4
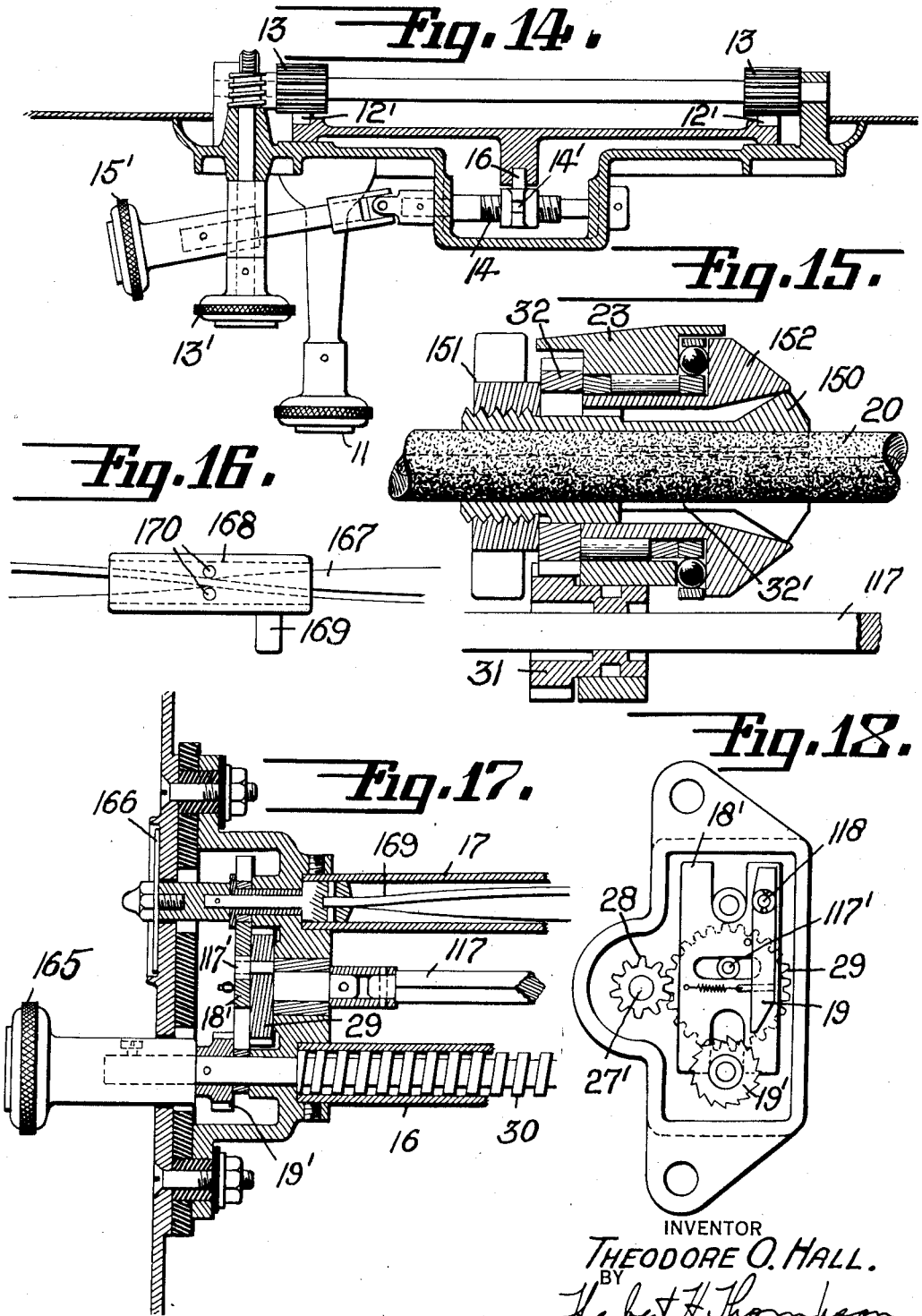
INVENTOR
THEODORE O. HALL.
BY Herbert H. Thompson
his ATTORNEY.

Patented Dec. 29, 1936

2,065,891

UNITED STATES PATENT OFFICE 2,065,891

AUTOMATIC PROJECTOR LAMP

Theodore O. Hall, New York, N. Y., assignor to Hall & Connolly, Inc., New York, N. Y., a corporation of New York Application February 15, 1932, Serial No. 593,004

18 Claims. (Cl. 176—70)

This invention relates to automatic projector arc lamps especially designed for motion picture projection where great reliability and a uniform non-flickering light of high intensity are essential. By my invention the standard thermostat feed used in automatic high intensity searchlights for feeding the positive electrode has been adapted and improved for projector lamp work, by a new design of compensated air-cooled thermostat and by a novel variable speed device which compensates for varying current consumption of the lamp and consequent variations in the rate of consumption of the electrodes. The negative electrode feed has been simplified by driving the same from the positive feed, but interposing a variable speed arrangement so that the proper relative rate of feed may be set up to suit the particular rate of consumption of the negative existing at the time.

Other objects of the invention will become apparent from the following detailed description.

Referring to the drawings showing the preferred form of the invention,

Fig. 1 is a side elevation of the projector lamp mechanism, the lamp box and lens mounting being shown in section.

Fig. 2 is a plan view of the same.

Fig. 3 is a large detail of the thermostat for controlling the positive feed.

Fig. 4 is a view of the thermostat taken at right angles to Fig. 3.

Fig. 5 is a side elevation of the projector lens, the mounting being shown in section.

Fig. 6 is a front elevation of the same.

Fig. 7 is a side elevation of the linkage which feeds the negative electrode and strikes the arc.

Fig. 8 is a front view of a portion of the lamp box showing the means for adjusting the projector lens.

Fig. 9 is a wiring diagram showing how the thermostat controls the feed.

Fig. 10 is a detail of the mechanical movement for varying the rate of feed of the negative electrode.

Fig. 11 is a detail showing how the mechanical movement of Fig. 10 is connected to the rod controlling the negative feed.

Fig. 12 is a sectional view of the one-way clutch shown in Figs. 10 and 11.

Fig. 13 is a sectional view of the feed screw for the positive electrode holder.

Fig. 14 is a sectional detail of the adjusting mechanism for the condenser lenses.

Fig. 15 is a vertical section of the positive holder.

Fig. 16 is a detail of the same.

Fig. 17 is a horizontal section of the rear of the lamp showing the hollow guide rods, feed screw, rotating squared shaft and indicator shaft.

Fig. 18 is a detail of the interior of the gear box shown in Fig. 17.

According to my invention, the projector lamp proper 1 may be mounted in the lamp box 2 and the proper focusing and adjusting of the beam effected accurately by adjusting the condenser or projector lenses 3 and 4 or other beam collecting means. For this purpose the lenses are clamped in an annular holder 5 which rests in a semi-circular support 6. Said support is provided at the bottom with a pair of lugs 7 and 8, the former being threaded to receive threaded shaft 7' and the latter having a notch 9 to receive guide shaft 10. By turning knob 11 on shaft 7', the lenses may be readily moved toward or away from the lamp to vary the focus.

For positioning the lenses in a vertical plane, the entire supporting framework 12 is adjustable vertically by means of racks 12' thereon and pinions 13 (Figs. 5 and 14) journalled on the stationary frame and rotated by a thumb piece 13'. For lateral adjustment there is provided a threaded shaft 14 turned by thumb piece 15' and on which is threaded a travelling nut 14'. Said nut has a tongue 16 at one side to engage a slot in a projection from frame 12 so that lateral movement of said nut carries the frame with it but free vertical adjustment of the frame may take place. For analogous reasons, the pinions 13 are elongated to permit lateral movement of said pinions without getting out of mesh with their racks 12'.

The positive electrode 20 is shown as slidably supported at its forward end by the holder 21 provided with cooling ribs 22. At its rear, the electrode is clamped in a rotatable holder 23 which is slowly advanced to feed the electrode along hollow guide rods 16 and 17. For supplying the power for feeding and rotating the electrode, there is provided a motor 24 coupled through suitable gearing to a vertical shaft 25 which in turn is connected through bevel gears 25' to shaft 26 having a universal connection 27 with a pinion 28. Said pinion meshes with a gear 29 on a squared shaft 117 and which carries an eccentric pin 117' (Figs. 17 and 18). The latter engages a slot in vertically slidable plate 18' on which is pinned at 118 a pawl 19 adapted to rotate ratchet 19' on the feed screw shaft 30 located preferably within guide rod 16 as pin 117' rotates. On shaft 117 is slidably mounted pinion 31 meshing with a gear 32 on the holder 23 so that the electrode gripping sleeve 32' within the latter is revolved to rotate the positive electrode. Quick hand feeding of the positive may be secured by rotating thumb piece 165. Sleeve 32' is preferably split or slotted at its forward end to form gripping jaws 150 which are passed inwardly to grip the electrode tightly by a nut 151 threaded on the inner end of said sleeve which draws the jaws inwardly against inner cam surfaces 152 on a rotatably mounted sleeve 153 at the forward end of the holder.

Also connected to said holder 23 is a depending bracket 34 in which is mounted a crank arm 35 and a slidable member 36 having teeth 37 on the upper end thereof (Fig. 13) adapted to pass through a longitudinal slot in rod 16 and to engage threads on the shaft 30 when raised. On the shaft of the arm 35 is a cam 38 so that by rotating the shaft the arm 36 is raised and lowered at will so that the positive feed may be temporarily disconnected and the entire carriage 23 slid backwardly when it is desired to recarbon.

I also prefer to mount an indicator at the rear of the lamp to show how far the positive electrode has burned away. Said indicator is shown in the form of a graduated disc 166 turned from a flat twisted bar 167 of one convolution for the complete travel of head 23. Said bar is preferably placed within the other hollow guide shaft 17. Secured to said positive head is a sleeve 168 (Fig. 16) which travels with the head but is prevented from turning by a pin 169 thereon. Within said sleeve is a pair of pins 170 on each side of bar 167 so that the bar is turned slowly as the head advances and with it the indicator 166.

According to my invention the positive electrode is continuously rotated and fed but the rate of feed is varied by a thermostat 40 to maintain the positive crater at the focus of the optical system. Preferably the slow speed of the motor is adjusted so as to be slightly less than the normal rate of consumption, while the high speed is somewhat greater so that the thermostat will be called into action intermittently to vary the feed between these two limits.

This may be accomplished as shown in Figs. 2 and 9. Light from the arc is concentrated by a lens 41 and reflected by an adjustable mirror 42 onto the thermostat strip 44 thus closing the contacts 44 when the beam from the arc strikes the same. This excites the magnet 45 attracting the armature 46 thereof against the action of the spring 47 and rotating the pivoted arm 48 about its pivot 49 to close contacts 50—51. When said contacts are closed a resistance 52, normally in series with the motor, is shunted out, thus speeding up the motor and increasing the rate of feed. If desired the resistance 52 may be in the form of a lamp 52' which is visible through a window 110 so that the operator may see when the lamp is feeding at its maximum rate. The effective speed of the motor is regulated by a centrifugal governor 53 on the shaft thereof, the end of which bears against or lies adjacent the arm 48. In case, therefore, the speed of the motor falls below its predetermined speed, the contacts 50 are closed to speed up the same even though the thermostat may not have acted. The point at which this occurs may be regulated by varying the tension of spring 47 by adjusting set screw 61.

As a further means to insure the proper rate of feed under extreme conditions, such as sudden increase in the current passing through the arc with a consequent abnormal rate of burning, I have shown a soft iron core 56 forming the armature of a solenoid, the winding of which consists of a few heavy turns of one of the lead-in wires 57 to the arc. Said armature is connected to pivot arm 58 carrying the complementary contact 51 and the pull of the solenoid is normally opposed by a spring 59. It will readily be seen, therefore, that when the current strength increases beyond a predetermined amount that contact 51 will be moved closer to contact 50 so that the average speed of the motor will be increased by causing contacts 50 and 51 to close whenever the speed falls below a greater minimum than otherwise. In operation the contact 50 continuously flutters against contact 51 when the thermostat is open and the effective time these contacts remain closed is dependent (1) on the position of 51 due to solenoid 56 and spring 59, (2) on the speed of motor 24, and (3) the adjustment of spring 47. When the thermostat is closed, however, the contacts remain closed giving the highest speed. The proper regulation of the motor speed may also be obtained by varying the position of the nut 62 for spring 59.

My preferred construction of thermostat is shown in Figs. 3 and 4. The main thermostat strip is shown at 40 which comprises the usual bimetallic strip which bends on changes of temperature. Said strip is bent at right angles at one end and rigidly clamped to a metal post 65 which may be rotatably adjusted and clamped in the base 66 by a nut 70 to vary the position of the strip. At its outer end there is riveted or otherwise secured to said strip a rigid metallic contact arm 67 preferably of aluminum and having a contact 44 at the end thereof. The cooperating contact arm 68 is secured to a second post 69 adjustably clamped in the base 66 by nut 70'. Arm 68, however, is also of bimetallic thermostat metal and carries at its outer end complementary contact 44'. The beam from the arc, however, only strikes the strip 40, the other strip being used to compensate for changes in temperature of the air in the thermostat housing. Being at right angles to the beam, it remains wholly unaffected thereby. Each of the posts 65 and 69 may be provided with plug ends 75—75' so that the thermostat may be plugged into and detached from the lamp proper at will. The thermostat housing as a whole is supported on a hinged or resilient arm 111 secured at one end only to the lamp structure, giving it an adjustable mounting so that the position of the thermostat may be changed by adjusting nut 160 on threaded stem 161 against coil spring 162 to vary the normal position of the positive crater.

I also mount in the lamp housing adjacent the thermostat a frosted window 76 on which the image of the arc and the tip of the positive electrode may be seen. As the arc burns back, the image will move along the ground glass over the scale 77. A pointer 78 may be provided to show the point at which the arc image strikes the thermostat so as to start the feed. In setting up the lamp, the thermostat is adjusted until the arc image lies in the desired position on scale 77 and the lenses are then adjusted so that the beam is obtained with the arc in that position.

Instead of providing an independent feed for the negative as usual in automatic searchlights, I prefer to drive the negative electrode directly from the positive feed. For this purpose there is mounted on the shaft 25 an eccentric or crank pin 80 which, as the shaft revolves, oscillates the arm 81 on its pivot 82 as the crank pin moves in the vertical slot 83. At its lower end said arm is linked through a link 84 to a notched disc 85 in a cup-shaped housing 86 so that the disc is oscillated back and forth within the housing. In the notches 87 of said disc are placed a plurality of rollers 88 and the notches are so shaped that the rollers wedge against the outer periphery of the cup when the disc is oscillated in a counter-clockwise direction in Fig. 10 and free the cup when the disc is rotated in the opposite direction. Therefore, the cup or housing will be given a step-by-step rotation. The spring pressed or friction block or brake 186 is for the purpose of preventing backward movement of the housing 86 on the back strokes of the discs 85.

In practice, however, I find the consumption of the negative electrode is not always a constant with respect to the consumption of the positive electrode and, therefore, I find it desirable to interpose a means for adjusting the rate of feed of the negative electrode by hand. To this end I have shown a setting arm 90 movable over a scale 91 (Figs. 1 and 10) and turning a threaded shaft 92. Said shaft is threaded through an arm 93 pivoted at 94 at the center of the housing 86. Said arm also carries pivot 82 of arm 81. By turning the handle 90, therefore, the pivot 82 is moved up or down as desired thereby changing the relative position of the pivot point of the crank 81 with respect to the crank pin 80 and thereby varying the throw of the link 84 per stroke.

The step by step movements of the housing 86 are transmitted to the negative electrode by any suitable means, such as a worm 95 on the shaft 96 of said housing, said worm meshing with a wormwheel 97 loosely mounted on shaft 98. A clutch 99 is provided to clutch the worm wheel to said shaft, said clutch being normally held out of engagement with the worm wheel by spring 130 so that thumbpiece 100 may be used to rotate the shaft 98 by hand when desired. The striking magnet or solenoid is shown at 101 and when excited moves the shaft 98 to the right in Fig. 11 and pulls the clutch into firm engagement to start the feed at the same time, but the thumb piece 100 may still be used to feed by hand if desired by slipping clutch 99. The shaft 98 feeds and strikes the negative by having a worm 102 thereon meshing with a worm sector 103. The latter carries an arm 104 which is loosely linked to a cross link 105 pivoted at its outer end to the negative holder 106 which is slidable on inclined trackway 107. At an intermediate point, link 105 is slidably mounted in a sleeve or bearing 108, the latter being pivotally mounted on a pin 109. During the first part of its movement, therefore, the negative carriage is moved by the tension on the link 105, the link sliding freely through sleeve 108 during this time. As, however, the link approaches the dotted line position when a greater tension would be required to move the carriage, the transmitting force becomes a torque on the link 105 about 109 as a pivot.

I also prefer to cool the housing 111 for the thermostat as well as the interior of the lamp box and the feeding mechanism. Air is supplied for both purposes by a fan 112 on the shaft of the motor 24. The air from said fan not only passes through the lamp structure proper but is guided to both sides of the thermostat as indicated by the arrows in Fig. 2. This assures proper actuation of the thermostat under all conditions, since without my invention the thermostat as a whole may become so hot that the arc beam will not make a sufficient temperature differential to close the contacts.

To improve the burning conditions of the arc and secure non-flickering operation, I prefer to pass the positive lead-in wires around and under the positive head as shown at 105 in Figs. 1 and 2. This creates a counteracting effect to the leads passing to the negative electrode and gives steady burning. A shutter 120 may be provided to shut off the light from the screen or stage quickly. A handle 121 secured to the shaft 122 on which the shutter is pivoted is shown for operating the same. The shutter is shown as made of a pair of separated discs 123 and 123' so that the heat will not reach the lens mounting.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an arc lamp, a two speed means for feeding an electrode, means responsive to the position of the arc for changing from the lower to the higher speed when the arc burns back more than desired, and means solely responsive to increase in the current consumption of the lamp for speeding up the feed.

2. In an arc lamp, a two speed means for feeding an electrode, centrifugal means for maintaining the lower speed substantially constant, means responsive to the position of the arc for changing from the lower to the higher speed when the arc burns back more than desired, and means solely responsive to increase in the current consumption of the lamp for speeding up the lower feed.

3. In a projector light, the combination with the positive and negative electrodes, of means responsive to the position of the positive crater for feeding the positive electrode at one of two speeds, means for feeding the negative electrode from the positive feeding means, and means for varying the ratio of the rate of negative feed with respect to the rate of positive feed.

4. In a projector light, the combination with the positive and negative electrodes, of means responsive to the position of the positive crater for feeding the positive electrode at one of two speeds, means for feeding the negative electrode from the positive feeding means, and means for varying the ratio of the rate of negative feed with respect to the rate of positive feed comprising a crank driven by the positive feed, a crank arm oscillated thereby, adjustable means for varying the extent of oscillation of the arm, a one-way clutch driven by said arm, and a shaft actuated thereby for feeding the negative electrode.

5. In a projector light, the combination with the positive and negative electrodes, of means responsive to the position of the positive crater for feeding the positive electrode at a variable speed, means for feeding the negative electrode from the positive feeding means, and means for varying the ratio of the rate of negative feed with respect to the rate of positive feed comprising a crank driven by the positive feed, a crank arm oscillated thereby, adjustable means for varying the extent of oscillation of the arm, a one-way clutch driven by said arm, a feed shaft rotated thereby, a second clutch between said first-named clutch and the feed shaft, a striking magnet, and means actuated thereby for throwing in said second mentioned clutch.

6. In a projector lamp, a negative electrode holder for holding said electrode at an angle to the positive electrode, an inclined trackway on which said holder is mounted, a link for feeding the same, a pivotal mounting for said link through which said link is also slidable, and an arm pivoted to one side of said pivotal mounting connected to said link and adapted when feeding the electrode first to slide the link through its mounting and then to rotate the latter.

7. In a projector lamp, a motor for feeding at least one electrode, means for varying the speed of the motor including a resistance in circuit therewith in the form of a lamp to serve as an indicator as well as a resistance, and means responsive to the position of the electrode arcing tip for controlling said first-named means to turn said lamp on and off, whereby an indication is given of the rate of feed.

8. In a projector lamp, the combination with the electrodes, of feeding means therefor, a motor for driving said means, a beam thermostat, and a variable speed regulator for the motor including a pair of normally fluttering contacts, the relative time during which said contacts are opened and closed being controlled both by said thermostat and by the motor speed.

9. In a projector lamp, the combination with the electrodes, of feeding means therefor, a motor for driving said means, a beam thermostat, an arc current responsive device, and a variable speed regulator for the motor including a pair of normally fluttering contacts, the position of which is controlled differentially by said thermostat, by the motor speed, and by the strength of the arc current.

10. In an automatic projector lamp, a motor for feeding both electrodes, a feeding and positioning mechanism for the negative electrode, a clutch for driving the negative feed from the motor, an arc striking solenoid, and a connection therefrom for both striking the arc and throwing in said clutch.

11. In an automatic projector lamp, a motor for feeding both electrodes, a feeding and positioning mechanism for the negative electrode, a clutch for driving the negative feed from the motor, an arc striking solenoid, a connection therefrom for both striking the arc and throwing in said clutch, and manual means for operating said feeding and positioning mechanism by hand regardless of whether or not the motor feed is operating.

12. In an arc lamp, a two-speed means for feeding an electrode, complementary contact means for throwing the feed from one to the other speed, means responsive to the position of the arc tip for governing the relative position of said contacts, and speed responsive means for fixing the slower speed at a minimum value also operating to govern the relative position of said contacts.

13. In an arc lamp, a two-speed means for feeding an electrode, complementary contact means for throwing the feed from one to the other speed, means responsive to the position of the arc tip for governing the relative position of said contacts, and means solely responsive to abnormal arc current also operating upon said contacts to speed up the feed.

14. In an arc lamp, a two-speed means for feeding an electrode, complementary contact means for throwing the feed from one to the other speed, means responsive to the position of the arc tip for governing the relative position of said contacts, means responsive to abnormal arc current, and speed responsive means for fixing the slower speed at a minimum value, all said three means operating to differentially control said contact positions.

15. In a feed and rotating mechanism for projector lights, an electrode gripping means, means for mounting the same for rotation and axial movement, a rotary squared shaft extending parallel to the movement of said gripping means, a gear slidably mounted thereon for rotating said means, a threaded feed shaft extending parallel to said other shaft, and means for rotating the same from said other shaft to feed the gripping means.

16. In a feed and rotating mechanism for projector lights, an electrode gripping means, means for mounting the same for rotation and axial movement, a rotary squared shaft extending parallel to the movement of said gripping means, a gear slidably mounted thereon for rotating said means, a threaded feed shaft extending parallel to said other shaft, means for rotating the same from said other shaft to feed the gripping means, a third parallel shaft, means for rotating the same very slowly as the gripping means advances, and an indicator of electrode consumption driven thereby.

17. In a projector lamp, a forward normally stationary electrode holder, rearward operating mechanism, a plurality of hollow guide rods connecting said holder and mechanism, an electrode gripping and feeding holder slidably mounted on said rods, a feed screw within one of said rods for feeding said holder, and a twisted bar within another rod for indicating the consumption of the electrode.

18. In a projector lamp or the like, the combination with the positive and negative electrodes, of means responsive to the position of the positive crater for feeding the positive electrode, means for feeding the negative electrode from the positive feeding means at a speed proportional thereto, including a crank driven by the positive feed, a crank arm oscillated thereby, a one-way driving connection between said crank arm and the negative feed, and means for preventing backward action of the negative feed during the return strokes of said crank arm.

THEODORE O. HALL.